(12) United States Patent
Ouchi (10) Patent No.: US 7,446,861 B2
(45) Date of Patent: Nov. 4, 2008

(54) OBJECT INFORMATION SENSING APPARATUS, POINTING DEVICE, AND INTERFACE SYSTEM

(75) Inventor: Toshihiko Ouchi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/548,253

(22) PCT Filed: Aug. 26, 2004

(86) PCT No.: PCT/JP2004/012685

§ 371 (c)(1),
(2), (4) Date: Sep. 6, 2006

(87) PCT Pub. No.: WO2005/022373

PCT Pub. Date: Mar. 10, 2005

(65) Prior Publication Data

US 2007/0070358 A1    Mar. 29, 2007

(30) Foreign Application Priority Data

Aug. 29, 2003   (JP)   ............................. 2003-306970

(51) Int. Cl.
*G01C 3/08*   (2006.01)
(52) U.S. Cl. .................................... 356/5.01
(58) Field of Classification Search ....... 356/5.01–5.15, 356/3.01–3.15, 4.01–4.1, 6–22
See application file for complete search history.

(56) References Cited

U.S. PATENT DOCUMENTS 4,071,297 A * 1/1978 Leitz et al. ................. 356/4.04
5,148,016 A * 9/1992 Murakami et al. .......... 250/221
5,319,387 A * 6/1994 Yoshikawa ................. 345/179
6,433,856 B1 * 8/2002 Yoo .......................... 356/3.01

FOREIGN PATENT DOCUMENTS

| JP | 64-010319 | | 1/1989 |
| JP | 11025370 A | * | 1/1999 |
| JP | 11-506825 | | 6/1999 |
| WO | WO 96/39612 | | 12/1996 |

* cited by examiner

Primary Examiner—Thomas H Tarcza
Assistant Examiner—Luke D Ratcliffe
(74) Attorney, Agent, or Firm—Fitzpatrick, Cella, Harper & Scinto (57) ABSTRACT

Information of an object can be measured from remote points in order to specify a position in an arbitrary space by human control. An object information sensing apparatus (5) measures information of objects (4, 4', and 4"), which configure at least one pointing device (1, 1' and 1"), in order to specify a position in an arbitrary space by human control from remote points. The object information sensing apparatus (5) includes generation units (6 and 7) for generating and radiating electromagnetic waves, a delay unit (10) for temporally delaying electromagnetic waves, and a unit (8) for detecting electromagnetic waves. A delay time is found by using a generated electromagnetic wave (14), an electromagnetic wave (15) that is reflected from the objects (4, 4', and 4"), and an electromagnetic wave that is delayed by the delay unit (10). Relative relationships between the object information sensing apparatus (5) and the objects (4, 4', and 4") are thus detected.

8 Claims, 7 Drawing Sheets

OBJECT INFORMATION SENSING APPARATUS, POINTING DEVICE, AND INTERFACE SYSTEM

TECHNICAL FIELD

The present invention relates to an object information sensing apparatus that causes electromagnetic waves to propagate into a space and detects the position of an object specified within an arbitrary object space. The present invention also relates to a pointing device, and to an interface system that uses the object information sensing apparatus and the pointing device.

BACKGROUND ART

The future arrival of the ubiquitous computing age brings about the needs to input information seamlessly to information equipment in a variety of locations and scenes and to operate the information. In particular, devices that input and output positional information, movement, and pointing information of an object or personal in arbitrary spaces are very important in constructing a user interface that is easy to use.

Conventionally, for-example, operations by contact with an interface portion, or extremely close proximity to the interface portion, have been developed as pen input and finger input on a display device or on a projection screen of a projector. An infrared pen input device has been proposed (refer to Japanese Patent Application Laid-Open No. H08-249112). In such device light from an infrared light emitting device of an external frame member of a screen is reflected by use of a stylus pen, and the position of the pen can be identified by a light-receiving device based on a visual angle of the reflected light. In this case, it is not necessary for structural members to be on the screen, and there are advantages in that the screen can be made in a large size, and there is no interference with a display device.

On the other hand, although remote controls have been in use for a long time for operations at distant locations, there are limitations to the operating functions thereof, and it is difficult to acquire highly accurate positional information. On-vehicle radars (refer to Japanese Patent Application Laid-Open No. H09-318737), for example, are used in detecting positions in space. The distance to an object can be measured with such radars by using laser light or electromagnetic pulses of millimeter waves or the like, based on a time difference until detecting reflected waves from the object.

There is a problem, however, with the infrared light pen input device described above in that detection becomes impossible if the light is blocked, and further, operations on a surface of the screen are basically necessary. Furthermore, since the method using a laser radar or millimeter wave radar allows distance measurements in a free space, vehicles and large size devices used outside have been developed. However, small size, lightweight devices used for a user interface have not been considered. In particular, something that is less interfered by obstacles than light and uses an electromagnetic wave method using millimeter waves or the like is necessary for a remote input/output interface system under a ubiquitous computing environment.

DISCLOSURE OF THE INVENTION

In view of the above problems, according to the present invention, there is provided an object information sensing apparatus for measuring, from remote points, information of an object that constitutes at least one pointing device controlled by a person in order to specify a position in an arbitrary space, the object information sensing apparatus including:

generation means for generating and radiating an electromagnetic wave;

delay means for temporally delaying the electromagnetic wave; and means for detecting the electromagnetic wave, wherein a relative position between the object information sensing apparatus and the object is detected by finding a delay time between the generated electromagnetic wave and an electromagnetic wave that is reflected from the object by using an electromagnetic wave that is delayed by the delay means (for example, the delay time is found by comparing those electromagnetic waves).

Based on the above basic configuration, more specific aspects can be presented as follows.

The electromagnetic waves are, for example, continuously generated electromagnetic pulses. In this case, if the electromagnetic pulses contain a Fourier spectrum up to a terahertz range having a half-width equal to or less than $10^{-11}$ second, the object information sensing can be performed with excellent accuracy.

Further, it is possible that:

the generation means includes a semiconductor pulse laser and a photoconductive element; and the relative position between the object information sensing apparatus and the object is detected by measuring a delay time by delaying a portion of light output of the semiconductor pulse laser using variable delay means within the object information sensing apparatus, and controlling the amount of delay to obtain an autocorrelation signal with the electromagnetic pulses reflected from the object.

The object information sensing apparatus can be configured to further include a memory portion in which waveform patterns of a plurality of reflected electromagnetic waves are stored in advance, and configured such that the object is specified by comparing the waveforms of the memory portion with a waveform of an electromagnetic wave that is reflected from the object.

Further, in view of the above problems, according to the present invention, there is provided a pointing device that is used for an object information sensing apparatus, the pointing device comprising reflecting means for reflecting electromagnetic waves from the object information sensing apparatus, wherein a reflection state of the reflecting means is changed by an operation portion.

Based on the above basic configuration, more specific aspects can be presented as follows.

The reflecting means can include a dielectric multilayer film having a predetermined dielectric constant and film thickness so that the reflecting means can be specified by difference in an overlapped waveform of a plurality of reflected electromagnetic waves that are reflected by interfaces in the multilayer film on the side of an object information sensing apparatus.

Further, the pointing device can be configured to include an antenna and an LC resonance circuit so that the reflecting means can be identified by the waveform of an electromagnetic wave that is reflected by the reflecting means on the side of the object information sensing apparatus. In this case, the resonance frequency of the resonance circuit may be made variable.

Further, in view of the above problems, according to the present invention, there is provided an interface system including a plurality of object information sensing apparatuses described above disposed in an arbitrary limited space, wherein the position of the reflecting means portion of the pointing device described above within the space is detected and input. Alternatively, according to the present invention, there is provided an interface system that detects and inputs a position, in an arbitrary space of an electromagnetic generating means portion of a pointing device including the electromagnetic generating means by change of a time taken for an electromagnetic wave from the pointing device to reach a plurality of object information sensing apparatuses that are provided with means for detecting electromagnetic waves.

Those interface systems can be adapted to include a configuration as follows.

Display information can be selected, changed, or inputted by selecting an arbitrary position of an image that is displayed by a display apparatus by use of a pointing device having the reflecting means or electromagnetic generation means.

Further, it is possible that the object information sensing apparatuses are made in a small size and integrated, and display information can be selected, changed, or inputted by handwriting by use of a plurality of pointing devices that are integrated with a display device. Further, it is possible that the object information sensing apparatuses are made small and integrated, an apparatus in which a plurality of the object information sensing apparatuses are integrated is connected to an information apparatus such as a display apparatus or a personal computer in the vicinity of a person that operates a pointing device, and display information can be selected, changed, or inputted by handwriting by use of the pointing device.

Furthermore, the pointing device can be operated while attached to a portion of a person's body. It is also possible that a tactile signal such as a vibration is provided to an operator when the operator operates the pointing device and performs specification of an arbitrary position or information input.

Using the object information sensing apparatus of the present invention, a pointing device that inputs information remotely by electromagnetic waves from an arbitrary point in space, and an interface system, can be configured. Further, the interface system containing a small, lightweight pointing device capable of performing information exchange with information equipment in a free space can be provided. In particular, for cases in which millimeter waves and electromagnetic waves that have a Fourier frequency in the terahertz range, a remote input interface that is not influenced greatly by shielding at a positioning precision equal to or less than 1 mm becomes possible. It becomes possible to perform handwritten information input, selection operations, and the like to a large screen display within a room, a portable display, or the like, whether in a contact or non-contact manner, so that a very agreeable user interface can be provided.

BEST MODE FOR CARRYING OUT THE INVENTION

Figures 1A, 1B:
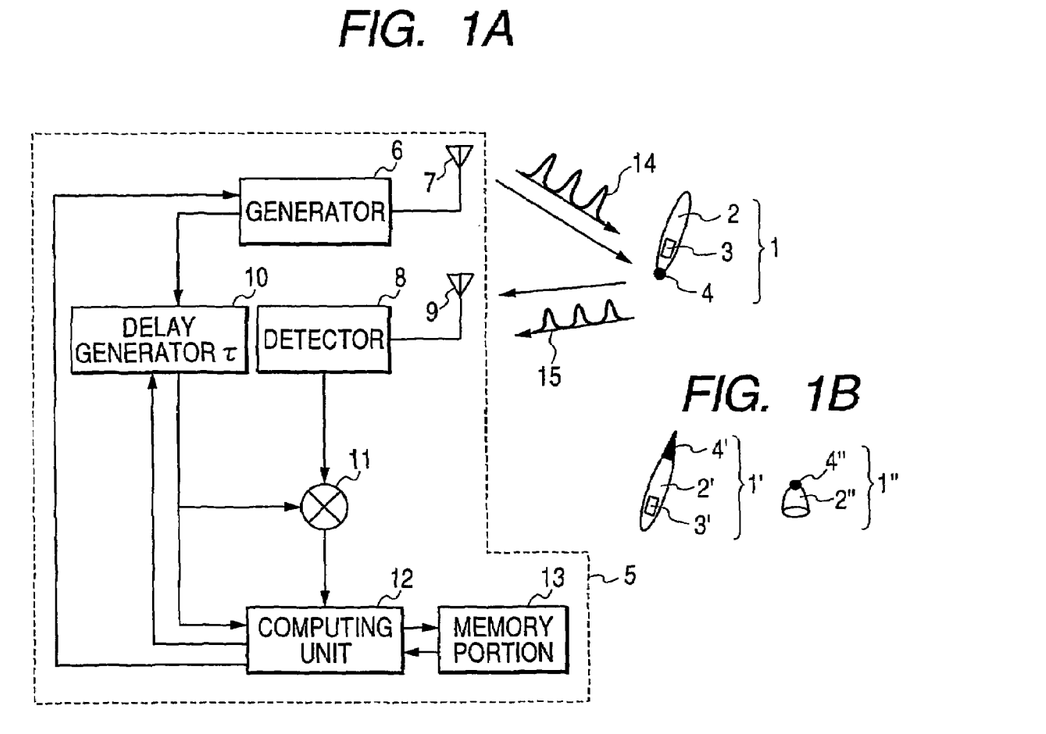
FIGS. 1A, 1B and 1C are diagrams that explain an example of a method for position information input according to the present invention.
Figure 1C:
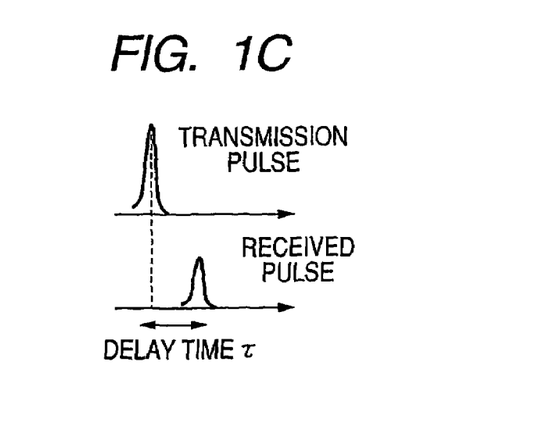

The present invention provides an easily usable user interface according to a small size, close range sensing apparatus that typically employs electromagnetic waves from microwaves to a terahertz range, and a pointing device including reflecting means. There are several basic principles for measuring distance by using electromagnetic waves. For example, a method is used here to compute a delay time between an electromagnetic pulse 14 generated by a generator 6 as shown in FIGS. 1A to 1C, and a received pulse that is received after reflecting off of a reflector portion 4 and returning to a detector 8. The delay time can be identified at this point by detecting a correlation output with a received pulse 15 while scanning a delay time provided that there is a delay generator 10 within a sensing device.

Figure 5:
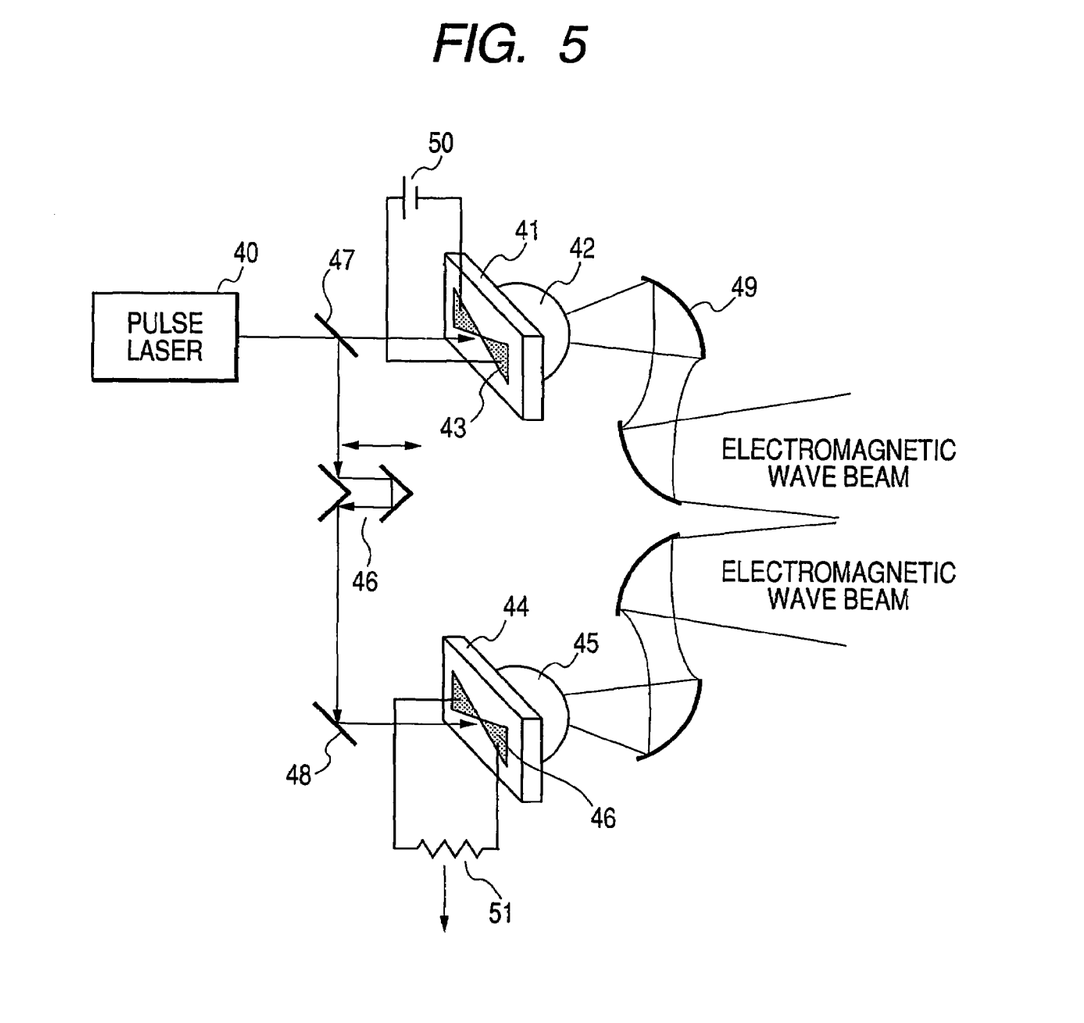
FIG. 5 is a diagram that shows an example of a configuration of a device according to a second embodiment that performs generation and detection by using electromagnetic pulses.

There is a method in which an ultra short pulse on the order of picoseconds is generated as an electromagnetic wave by using a semiconductor mode-locked laser and a photoconductive element (refer to an example in FIG. 5). In this case, position information input can be performed at a precision on the order of 100 μm, as described in detail hereinafter. For cases in which the method is used as an interface, it is desirable that the method be capable of detection when a plurality of pointing devices are separated from each other. For example, such separation can be achieved if a dielectric multilayer film is used in reflecting portions and a reflection echo pattern at each interface between the dielectric multiple layers is given an ID. Accordingly, the dielectric constant and the thickness of the multilayer film of the pointing device may each be set differently (refer to an example in FIG. 6).

Further, an ultra wide band method (UWB, pulse width: approximately 1 nsec, frequency band: from 3.1 GHz to 10.6 GHz) may also be used as another electromagnetic wave generation method. In this case, it is possible to integrate a signal receiver and a signal transmitter as a silicon IC, and the IC can be made small in size and low in power consumption. At this point, identification can be performed according to the waveform of a reflected pulse, provided that resonance frequencies between solid objects are differentiated by using an antenna and an LC resonance circuit for identification between a plurality of pointing devices.

For cases in which this type of apparatus operates in an arbitrary space such as within a room of a building, a plurality of sensing apparatuses can be installed on walls or the ceiling of the room. Distances are measured by the reflected electromagnetic waves from the respective pointing devices, and a three dimensional position is identified by computing the results overall (refer to an example in FIG. 3).

Devices such as large screen displays installed within a room, projectors that project onto a wall or a screen, portable thin type display devices, and the like are given as devices that input information by these types of remote operations. It is sufficient to be able to conduct position detection within a range of at most 1 m for the case of a portable display. Accordingly, a sensing apparatus can be made small in size and embedded into a frame of the display. Further, this type of position detection apparatus can be implemented in a card shape, connected to information equipment such as a personal computer, and made to function for remote hand writing input using a space in the vicinity of the card (refer to an example of FIG. 9).

More specific embodiments are described hereinafter, and basically electromagnetic waves in a range from microwaves to terahertz are used. However, the present invention can also be applied to cases in where other wave bands involving electromagnetic waves such as light, supersonic waves, and the like are used, and to cases in which these methods are mixed.

First Embodiment

In a first embodiment of the present invention, the present invention is applied to a man-machine interface which includes a pointing device that performs input of position information at an arbitrary point in a space such as a conference room or a family living room.

Figure 2:
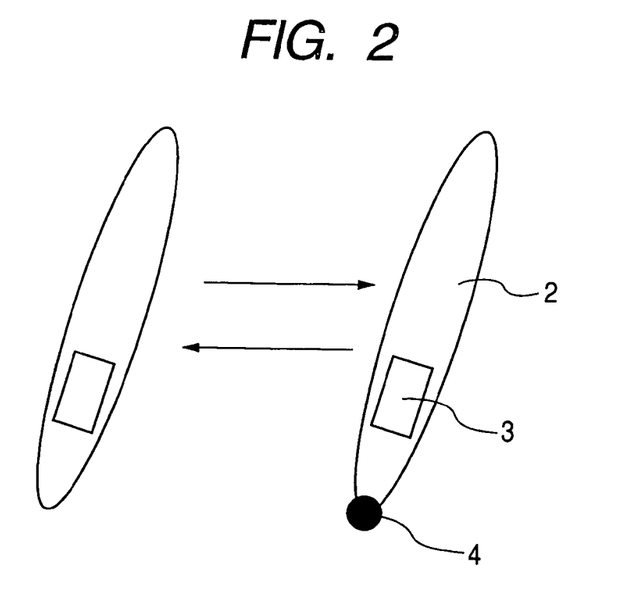
FIG. 2 is a diagram that explains an example of a pointing device used for the present invention.

A position information input method using a pointing device is explained by referring to FIGS. 1A to 1C. A pointing device 1 includes a main body 2, a switch 3, and a reflector portion 4. Although a pen-shaped stick-like form is suitably used as shown in the figures, the shape may of course be an arbitrary shape. For example, forms having a shape that may be attached easily to the body such as a fingerstall, ring, and bracelet as denoted by reference symbol 1" of FIG. 1B may also be used, and forms that are attached to clothing may also be used. The reflector portion 4 performs electromagnetic wave reflection, and a metallic spherical reflector portion is used in this embodiment. Alternatively, a conical reflector portion 4' like that in FIG. 1B may also be used. Reflecting portions 4, 4', and 4" may be any surfaces of lower portions, upper portions (FIG. 1B), side surfaces, and the like of main bodies 2, 2' and 2". Switches 3 and 3' that are provided in a stick-like main body mechanically perform operations for exposing and retracting the metallic reflection portion as shown in FIG. 2. Electronic circuits and electric power supplies are therefore not necessary in the stick-like pointing device at all. Electromagnetic wave reflection is performed when the metallic reflector portion 4 is exposed, and a spatial position at the moment when the switch 3 is pushed can be identified. Further, a three dimensional continuous trajectory can be input to a sensing apparatus 5 when the pointing device is operated in a state where the metallic reflector portion 4 is exposed.

The position of the reflector portion 4, which is object information, is found as shown in FIG. 1C by detecting a propagation delay time τ between an electromagnetic wave transmission and received pulses. The object information sensing apparatus 5 that detects the relative position with respect to the reflector portion 4 comprises an electromagnetic pulse generator 6, an antenna 7 that transmits an electromagnetic pulse 14 into a space, an antenna 9 that receives a reflected pulse 15 from the reflector portion 4, a detector 8, a delay generator 10 that delays the timing at which pulses are generated by the generator 6, a mixer 11 that mixes a delayed transmission pulse with the received pulse, and a computing unit 12 that identifies a distance from the actual delay time τ. A memory portion 13 that stores a variety of data may also be included, depending upon the circumstances. These components can be unified or integrated within a package, but it is not always necessary that the components be included within one member. Output from the mixer 11 is so designed that a maximum output is obtained when the timing of a time delayed transmission pulse signal and the timing of the received pulse coincide. With the computing unit 12 the distance to the reflector portion 4 can be detected by monitoring the output of the mixer 11 while sweeping control of the amount of delay due to the delay generator 10 is performed and identifying the propagation delay time of the electromagnetic wave.

At this point, the output of the electromagnetic pulse from the generator 6 may be varied by a low frequency wave on the order of 1 kHz to 100 kHz, and a known synchronous detection technique that further extracts the output of the mixer 11 as a mixing output with the low frequency signal may also be used. The computing unit 12 can also control the generation period of the electromagnetic pulse and the pulse position (phase), and when necessary, remove the influence of multiple paths due to obstacles and the like, increasing the S/N ratio of the signal. That is, separation noise components caused by reflections other than that by the reflector portion 4, or a plurality of echoes due to pulses reflected by walls and the like, is difficult for cases of a fixed period. However, if the period is varied by a pattern determined in advance, signal separation becomes possible by performing control of the delay generator 10 in response to the variations. The determined pattern is stored in advance in the memory portion 13, and distance computation processing is performed by accessing the pattern when necessary. A distance d to the reflector portion 4 can be found by the following equation, where the electromagnetic wave propagates in a space at the speed of light c:

$$d=\tau c/2 \qquad (1)$$

Spatial resolution and response speed in performing position input by the pointing device 1 are explained next. The response speed is determined depending on a period of sweeping control of the amount of delay performed by the delay generator 10. When suitable initial position settings are performed according to a flowchart that is explained later, it is possible to obtain a sampling rate of 1 msec or less by setting the sweeping control range of the delay amount to a minimum value. For example, considering that the pointing device is used as a user interface, and that the range in which a human moves the device within 1 msec is at most on the order of 1 cm (36 km/hour), a sampling rate of 100 μsec is sufficient for sampling with a precision of 1 mm. The delay time for 1 mm distance is 6.7 psec from Equation (1). It is considered that it is sufficient to sweep a delay amount of approximately twice the delay time, or 13 psec, every 100 μsec in order to detect such distance. It is of course necessary that the period of the synchronous detection and the transmission period of the electromagnetic pulse be shorter than 100 μsec, that is, equal to or greater than 10 kHz. 100 kHz is used for the synchronous detection period, and 80 MHz is used for the electromagnetic pulse period here.

The pulse width of the electromagnetic pulse mainly determines the spatial resolution. For cases where the pulse width has a 1 mm precision, it is necessary from Equation (1) that the precision of the delay time be 6.7 psec for measurement. However, if signal separation is assumed possible up to on the order to 20% of the pulse half width, a pulse having a half width value of approximately 33 psec is sufficient. Conversely, position detection on the order of 100 μm becomes possible if there is a pulse on the order of 3 psec.

Figure 3:
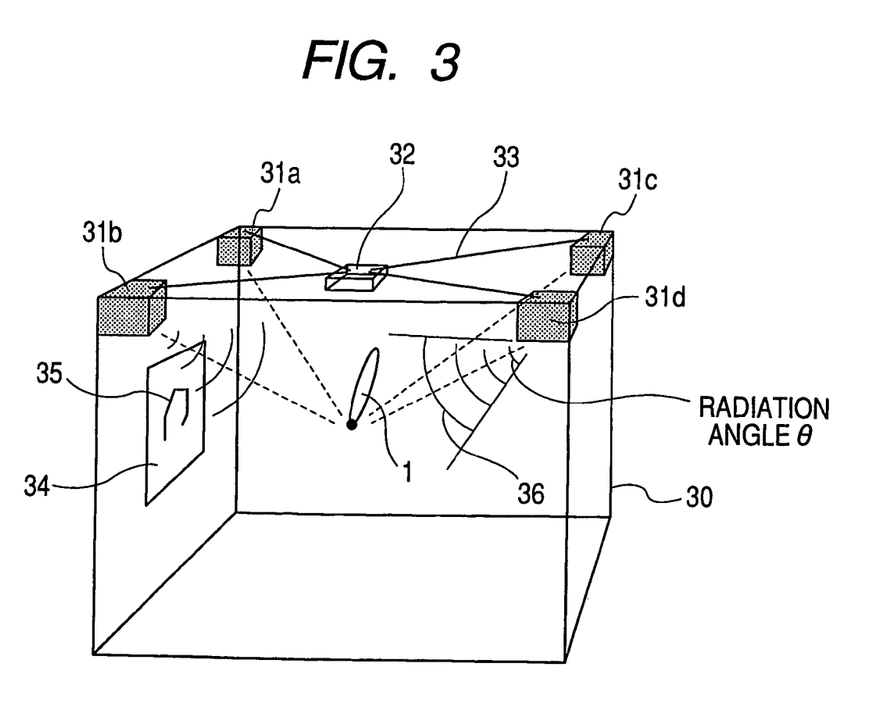
FIG. 3 is an overall perspective view of an interface system according to a first embodiment that performs position information input within a room.

An example of using the device in an actual practical space is explained using FIG. 3. Four object information sensing apparatuses 31a to 31d according to this embodiment are installed on at four corners of a ceiling of a room that possesses a space 30. The position and state of the reflector portion of the pointing device 1 that are detected by the four object information sensing apparatuses 31a to 31d are collected in a central processing unit 32 by using signal lines 33, and a three dimensional position is computed. It is preferable to use about four object information sensing apparatuses in order to increase the position precision and because electromagnetic waves may not be able to be transmitted due to being blocked by a human body. However, a constitution having a less number of the object information sensing apparatuses may also be used. Further, it is not always necessary that the installation location be on the ceiling. Forms in which the object information sensing apparatuses are installed on a wall, a floor, or are hung may also be used. The usable range is determined by the installation locations of the object information sensing apparatuses 31a to 31d, and a radiation angle θ of a transmission pulse 36. Wave radiation may be performed by using a beam having high directionality, and the beam may be scanned in a range of the radiation angle θ. In this case, scanning can be performed by phase control by using a phased array antenna, and by using a method in which the antenna is manufactured to be provided on micro-electrical-mechanical systems (MEMS), and the antenna is moved mechanically.

The pointing device 1 is operated by a person within a useable range of a room. In this embodiment, the results of the central processing unit 32 are transferred, and arbitrary points within a screen of a wall-hung television 34 within a room can be selected from a remote place, and hand writing input 35 can be performed. A select function is used for clicking of menu buttons within the screen or the like. Input that corresponds to finger movement can be performed if the fingerstall shown in FIG. 1B is used. Projecting to a wall screen or the like may be performed by a projector as an image device. The pointing device 1 may also be given a tactile device function with which signal transfer is performed and static electricity or vibration is generated in response to hand writing or clicks. In this case, an electric power source for the pointing device 1 is necessary.

Figure 4:
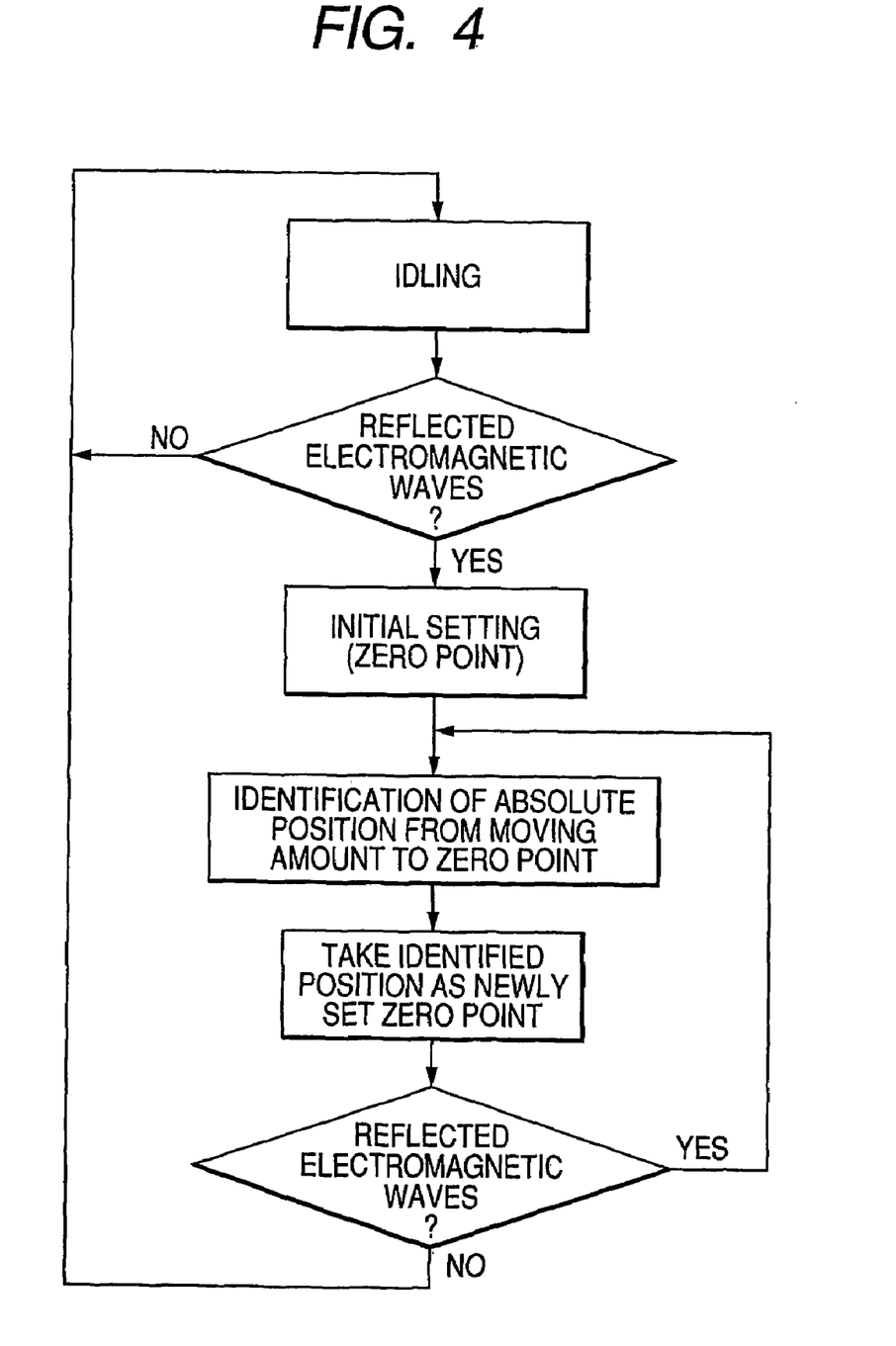
FIG. 4 is a flowchart for performing position detection according to a third embodiment.

A simple flowchart in performing position detection is shown in FIG. 4. A state in which the switch of the pointing device 1 is set to off is a state where there is no reflected electromagnetic wave, and therefore is an idling state (waiting state). A large sweep of the time delay amount of the delay generator 10 with respect to the entire usable range (for example, approximately 13 nsec for a 2 m range) is necessary when the switch is first turned on. Accordingly, time is required for position detection, and a zero point is recognized in a time on the order of 100 msec (step 3). The amount of sweeping of the delay time can be made smaller (10 psec, for example) for cases where reflected electromagnetic waves are continuously present thereafter, and position sampling is therefore performed at 100 μsec intervals while continuously correcting the zero point (steps 4 to 6). An idling state is obtained when the switch is turned off (step 1).

As explained above a system is so structured that the pointing device provided with the electromagnetic wave reflecting function and the object information sensing apparatus can be connected, an interface system that possesses a function of remote input/output with respect to the image device can be realized. Although a method using electromagnetic waves having a small pulse width is mainly performed here, measurements can also be made by using a highly coherent electromagnetic wave (continuous wave) and employing its interference. In this case, continuous wave (CW) such as millimeter waves and terahertz waves can be obtained by mixing light from two semiconductor lasers, and converting a beat frequency to an electromagnetic wave. The wavelength can be changed by changing the wavelength of the semiconductor lasers according to injected currents.

Second Embodiment

A specific example of a configuration of an integrated object information sensing apparatus and reflection portion of a pointing device suitable to the object information sensing apparatus is shown in this embodiment; As explained in the first embodiment, a picosecond order electromagnetic pulse is necessary in order to obtain a positioning on the order of 100 μm. A pulse generation method in which pulse lasers are applied to photoconductive elements 41 and 44 as shown in FIG. 5 is suitably used here. The photoconductive elements 41 and 44 are so structured that 1.5 μm of low temperature growth of non-doped Lt-GaAs is conducted by MBE on a semi-insulating GaAs substrate at 250° C., and then bow tie antennas 43 and 46 made from Ti/Au and having a 5 μm gap in a central portion thereof are formed on surfaces of the photoconductive elements 41 and 44, respectively, in order to increase the coupling between the electromagnetic waves and the space. Si semispherical lenses 42 and 45 for increasing the collecting efficiency are bonded to the other surfaces of the photoconductive elements 41 and 44, respectively.

A mode-locked laser 40 is used as a pulse laser having a pulse width on the order of 100 femtoseconds to 1 picosecond. Output of the mode-locked laser is made to diverge by using a beam splitter 47, and emitted to the photoconductive element 41 functioning as a signal generator, with an electric field applied to the antenna 43 by a 30 V electric power source 50. Electromagnetic pulses having a pulse width from several hundreds of femtoseconds to several picoseconds are thus generated. When the pulse is beam-adjusted by an off-axis parabolic mirror 49 and emitted into the space, a transmission pulse used for position detection is obtained. The transmission pulse is a wide band electromagnetic wave that contains terahertz region Fourier frequencies. Reflected pulses are detected by the photoconductive element 44 having the identical structure. At this point, electric current flowing in both ends of the antenna 46 is extracted as output of a voltage of both ends of a resistor 51. At the same time, light is radiated, and the output is obtained according to the strength of the electric field of the electromagnetic pulse only at the timing under which the light carrier is generated. Therefore the photoconductive element 44 possesses a combined function of the detector 8 and the mixer 11 of FIG. 1A, because a light delaying element 46 that varies the light path corresponds to the delay generator 10 of FIG. 1A, and the delayed light pulse and the electromagnetic pulse are radiated simultaneously by the reflecting mirror 48. Electromagnetic wave radiation and received signal control are performed by the lenses 42 and 45 and the reflecting mirror 49 together to provide the functions of the antennas 7 and 9 of FIG. 1A in this example.

The object information sensing apparatus can be constructed by integrating those components. Mode-locked lasers that use titanium sapphire crystals or optical fibers are stable as the pulse laser, but a semiconductor mode-locked laser having a super-saturation absorption region may also be used to miniaturize the object information sensing apparatus. Further, an object information sensing apparatus that is very small and stable can be realized by using optical fibers as light transmitting paths, and integrating the photoconductive elements and the light wave guide paths on the same substrate.

Figure 6:
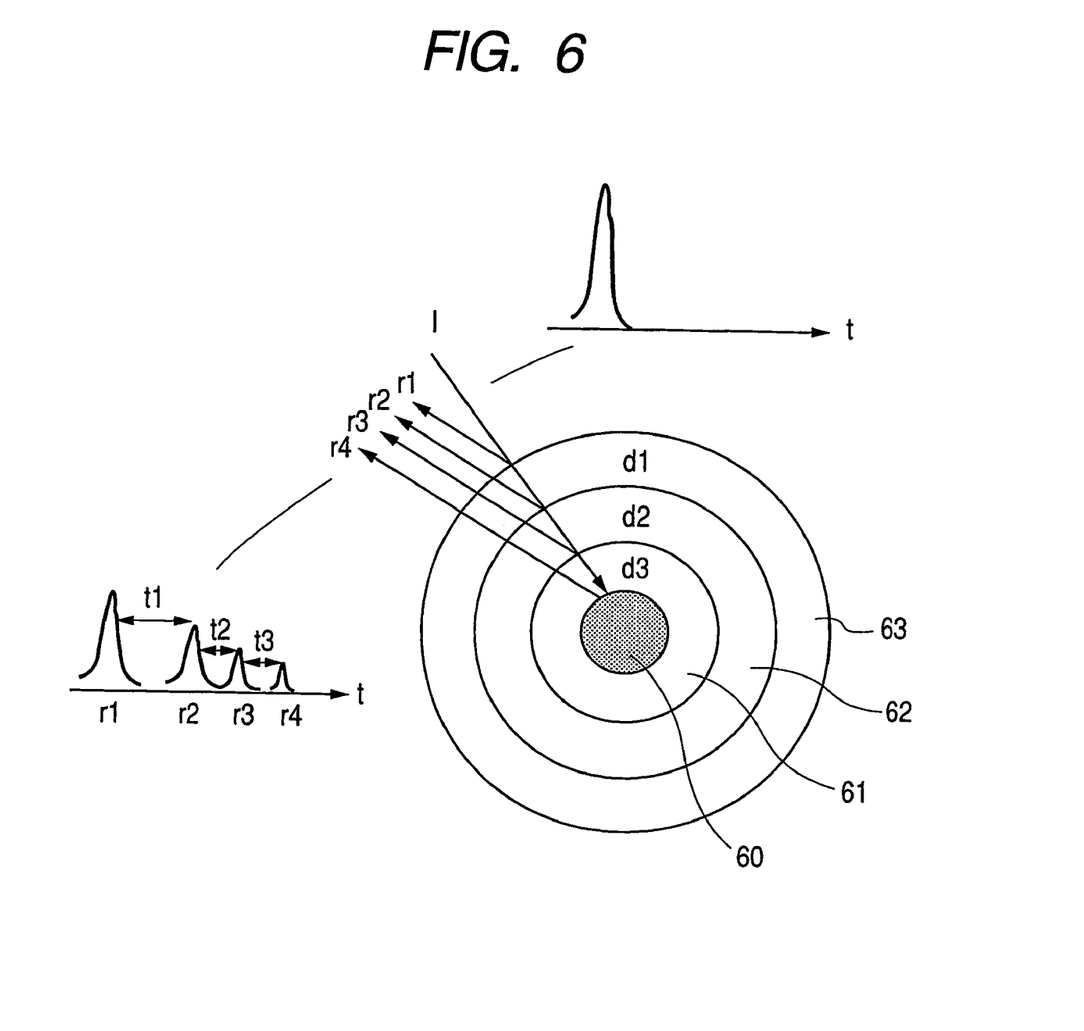
FIG. 6 is a diagram that explains a multilayer film reflection portion of a pointing device.

On the other hand, if a multilayer film structure like that of FIG. 6 is used as a reflecting portion of a pointing device for cases of using an electromagnetic pulse that reaches the terahertz region, a plurality of echo pulses reflected by interfaces thereof are obtained. FIG. 6 shows a cross sectional structure of only the reflecting portion. When an incident electromagnetic pulse I arrives, reflected pulses r4, r3, r2, and r1 are generated by interfaces between dielectrics 61, 62, and 63 that are deposited on the surface of a metallic sphere (center portion) 60. By providing a plurality of films whose thickness d and dielectric constant are changed, eigenvalues that include time differences t1, t2, and t3 between the echo pulses with respect to the fastest arriving reflected pulse r1 and the number thereof can be allocated to a plurality of pointing devices. That is, for cases where a plurality of persons operate pointing devices that possess separate reflecting portions in the same room, information for individual persons can be separated out and detected. Alternatively, one person attaches pointing devices to a plurality of locations on the person's body, and the motion by the person can be detected. It can therefore be identified from which pointing device a signal has been detected, which leads to an increase in the S/N ratio, provided that reflected echo pulse patterns of pointing devices having respective allocated IDs are stored in the memory portion 13 of FIG. 1A, and pattern matching is performed by the computing unit 12.

When an electromagnetic pulse having a 1 psec pulse width is used at this point, and a 50 μm dielectric having a specific dielectric constant $\epsilon$ of approximately 6 is used, echo pulses with a time difference of approximately 0.8 psec are generated by front and back surfaces ($\sqrt{\epsilon}$ is assigned to the denominator of Equation (1)), and separation and recognition can thus be performed. Similarly, the time difference between the echo pulses can be changed by changing the thickness and the dielectric constant. For cases of using pulses on the order of 100 psec, a dielectric having a thickness on the order of 5 mm is necessary, and this is not practical. This is only effective for cases of using picosecond order short pulses like those of this embodiment.

Third Embodiment

An interface system of the present invention can also use an ultra wide band (UWB) system whose specifications are continuing to be developed (3.1 GHz to 10.6 GHz, position detection IEEE 802.15.4, high speed wireless transmission IEEE 802.15.3a). Electromagnetic pulses having a pulse width on the order of 1 nanosecond are used with this system. Accordingly, distance precision is from 2 to 3 cm with one object information sensing apparatus. However, the precision can be increased by using a plurality of the object information sensing apparatuses together. That is, a system like that of FIG. 3 of the first embodiment can be applied. Signal generators and signal receivers can be realized by using Si ICs with the UWB system, and therefore the object information sensing apparatus can be configured by using extremely small circuits. That is, the electronic circuit portions of the object information sensing apparatus configured as in FIGS. 1A to 1C can be formed in one chip on the order of 3 mm square, and wide band antennas on the order of 1 cm can be formed in a hybrid mounted microwave IC (MIC) configuration.

The reflecting portion of the pointing device may be a metallic sphere like that of the first embodiment. A reflecting circuit accompanying time delays and frequency dispersions and structured by an LC resonance circuits containing small antennas may also be used. Electromagnetic pulses contain a wide Fourier frequency spectrum, and accordingly a time waveform changes if only specific frequency components are strongly reflected by the resonance circuits. An ID function can therefore be provided when the resonance frequencies are individually set according to pointing device. Alternatively, the resonance frequencies may also be changed by incorporating a variable-capacitance element into the resonance circuits. The waveform of the reflected electromagnetic wave can be changed by a switch when a mechanical variable-capacitance element that can be operated by the switch 3 of the pointing device 1 of FIGS. 1A, 1B and 1C is used.

Figure 7:
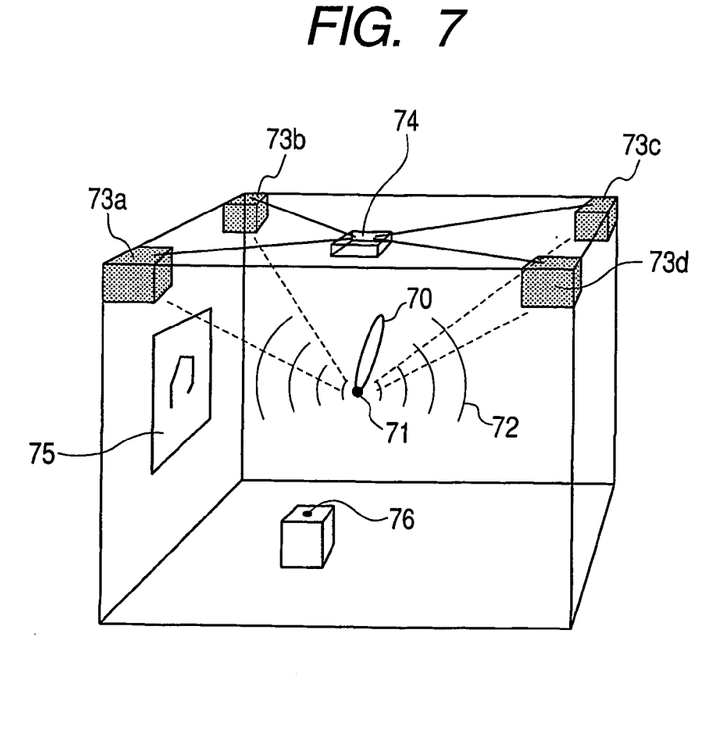
FIG. 7 is a perspective view that explains an interface system according to a third embodiment that performs position information input within a room.

In addition, the apparatus can thus be made extremely small and its electric power consumption can be reduced. Accordingly, a signal generator can also be provided to the pointing device side. FIG. 7 shows such a case. A small size signal generator 71, not a reflecting portion, is embedded into a distal end of a pointing device 70. An electromagnetic pulse 72 is made to propagate, and the spatial position of the signal generator 71 is computed by a central processing unit 74 from arrival time differences at separated computing units 73a to 73d that contain signal receivers. In this case, the position of a location 76 that corresponds to a zero point within the space is first determined. The absolute position can be found by regulating the zero point. Reference numeral 75 denotes a display. An interface system that performs position information input within a three dimensional space can thus be realized by using a system in which the signal generator and the signal receivers are separated.

Further, if different pulse period patterns are used for the pulses generated from each of the signal generators for cases where a plurality of pointing devices are used simultaneously, each of the pointing devices can be distinguished and detected. That is, each of the signal generators may be made to generate transmission pulses with fixed pattern pulse position modulation, and patterns for each of the pointing devices may be stored in the memory portion 13 of FIG. 1A. Each of the pointing devices may be identified by performing pattern matching.

Fourth Embodiment

Figure 8:
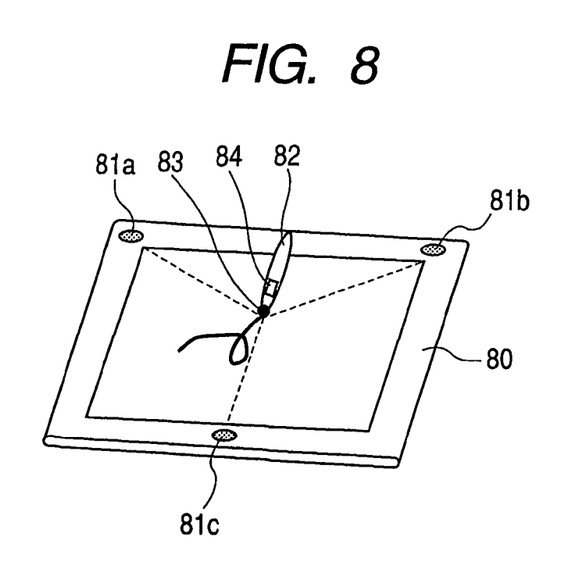
FIG. 8 is a perspective view of a display device with hand writing input according to a fourth embodiment of the present invention.

A fourth embodiment of the present invention is applied to an input apparatus of a thin portable display like that of FIG. 8. Advances in thin, small size displays such as liquid crystal displays, EL displays, and electronic paper are in progress, and the development of displays that have flexibility is being made in recent years. The demand for pen input into these types of screens has been increasing. Hand writing input and the like can be performed by a pen type pointing device 82 having a switch 84 and a reflecting portion 83, provided that the object information sensing apparatus according to the present invention is made into small sizes, and mounted at locations 81a to 81c in a frame of a display 80. In this case, special structures do not need to be built into the screen side. Accordingly, lower cost and a larger screen can be achieved while bringing out the performance of existing displays. In addition, the detection tolerance for cases where light is blocked by a finger or the like can be increased compared to infrared ray methods. This is because microwaves to terahertz region electromagnetic waves that possess wavelengths less than 1 mm have a larger diffraction due to diffractive effect than infrared rays having a wavelength on the order of 1 μm.

Remote input separated from the display apparatus can be performed with this method similar to the embodiment described above. That is, contact with a screen portion is not necessary, and operations are possible from a separated location.

Figure 9:
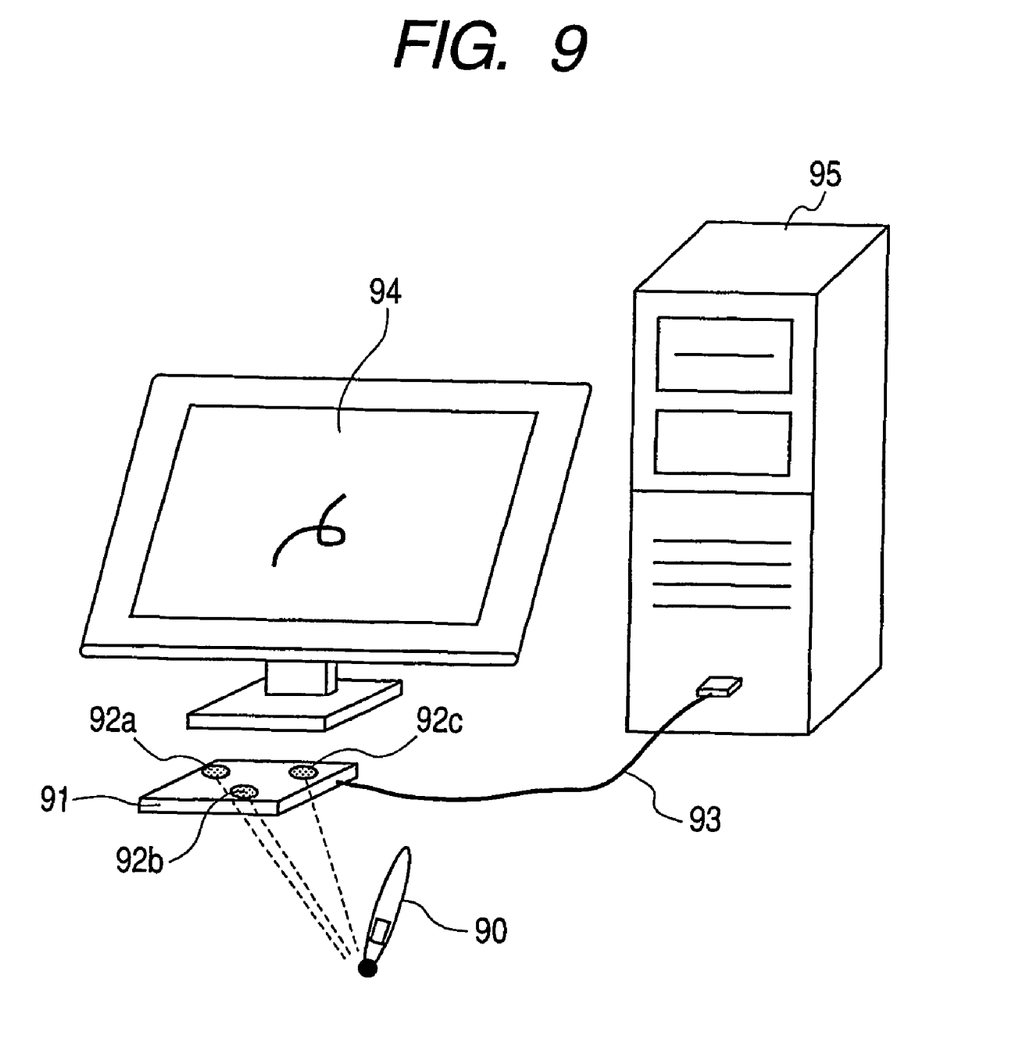
FIG. 9 is a perspective view that explains another form of a hand writing interface according to the fourth embodiment of the present invention.

A case of incorporating the object information sensing apparatuses 81a to 81c in the frame of the display 80 is shown here. A plurality of sensing portions 92a to 92c are integrated and made into a card 91 as shown in FIG. 9 and information exchange with the pointing device 90 may be performed by setting the card in the vicinity of an operator. The card 91 can also be connected to a separate information apparatus, for example a personal computer 95, home electronics such as a television, a liquid crystal projector, a portable telephone, a head mounted display, or the like, and can then function as an interface with the information apparatus. The personal computer 95 and the card 91 can be connected by using a USB cable 93 or the like, but may also be connected wirelessly. This type of card can be easily carried and connected to the apparatus being used, and hand writing and the like can be performed on a screen 94.

It should be noted that it is also possible to perform signal transfer from information apparatuses such as imaging apparatuses in this embodiment, and that tactile functions such as vibrations can also be imparted through the pointing device 90.

This application claims priority from Japanese Patent Application No. 2003-306970 filed Aug. 29, 2003, which is hereby incorporated by reference herein.

The invention claimed is:

1. An apparatus comprising:
a pointing device including a reflecting portion for reflecting an electromagnetic wave; and
a sensing portion including a generating portion for generating the electromagnetic wave, a detecting portion for detecting the electromagnetic wave reflected from the reflecting portion, a delay portion for delaying either one of a time for the detecting portion to detect the electromagnetic wave and a time to mix a signal from the detecting portion and a signal from the generating portion, and a memory portion for storing information as to the electromagnetic wave to be reflected at the reflecting portion in advance,
wherein the sensing portion acquires information as to a time wave form of the electromagnetic wave reflected from the reflecting portion obtained by using the delay portion, separates information as to the electromagnetic wave reflected from the reflecting portion from the information as to the time wave form using the information stored in the memory portion, and acquires a relative position between the sensing portion and the pointing device from a time period between generation, at the generating portion, of the electromagnetic wave reflected from the reflecting portion and detection thereof at the detecting portion.

2. The apparatus according to claim 1, wherein the electromagnetic wave is an electromagnetic wave pulse having a pulse width within the range of from several hundred femtoseconds to several picoseconds.

3. The apparatus according to claim 1, wherein the reflecting portion has a multilayer structure each layer of which is comprised of a dielectric, at least one of the film thickness and the dielectric constant of each layer being different for every layer.

4. The apparatus according to claim 3, wherein the apparatus comprises a plurality of the pointing devices, and wherein the reflecting portions of the pointing devices have different structures.

5. The apparatus according to claim 1, wherein the reflecting portion comprises an antenna and an LC resonance circuit.

6. The apparatus according to claim 1, wherein the reflecting portion comprises a metal.

7. The apparatus according to claim 1, wherein the reflecting portion has a multilayer structure.

8. An apparatus comprising:
a pointing device including a reflecting portion for reflecting an electromagnetic wave; and
a sensing portion including a generating portion for generating an electromagnetic wave pulse having a pulse width within the range of from several hundred femtoseconds to several picoseconds, a detecting portion for detecting the electromagnetic wave pulse reflected from the reflecting portion, a light delaying element for varying the length of a path of a light to be radiated to the detecting portion to delay a time for the detecting portion to detect the electromagnetic wave pulse, and a memory portion for storing information as to the electromagnetic wave pulse to be reflected from the reflecting portion in advance,
wherein the sensing portion acquires information as to a time wave form of the electromagnetic wave pulse reflected from the reflecting portion obtained by using the light delaying element, separates information as to the electromagnetic wave pulse reflected from the reflecting portion from the information as to the time wave form using the information stored in the memory portion, and acquires a relative position between the sensing portion and the pointing device from a time period between generation, at the generating portion, of the electromagnetic wave pulse and detection thereof at the detecting portion.

* * * * *